United States Patent
Chung et al.

(10) Patent No.: US 10,121,424 B2
(45) Date of Patent: Nov. 6, 2018

(54) DISPLAY DEVICE

(71) Applicant: AU OPTRONICS CORPORATION, Hsin-chu (TW)

(72) Inventors: Yueh-Hung Chung, Hsin-chu (TW); Hsueh-Ying Huang, Hsin-chu (TW); Wei-Chun Wei, Hsin-chu (TW); Shu-Cheng Kung, Hsin-chu (TW); Ken-Yu Liu, Hsin-chu (TW); Ya-Ling Hsu, Hsin-chu (TW); Chen-Hsien Liao, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 66 days.

(21) Appl. No.: 15/601,143

(22) Filed: May 22, 2017

(65) Prior Publication Data
US 2018/0137827 A1    May 17, 2018

(30) Foreign Application Priority Data
Nov. 17, 2016    (TW) .............................. 105137635 A

(51) Int. Cl.
*G09G 3/36* (2006.01)
*G02F 1/1343* (2006.01)

(52) U.S. Cl.
CPC ....... *G09G 3/3607* (2013.01); *G02F 1/13439* (2013.01); *G02F 1/134309* (2013.01); *G02F 2001/134345* (2013.01); *G02F 2201/121* (2013.01); *G02F 2201/123* (2013.01); *G09G 2320/0233* (2013.01); *G09G 2320/0247* (2013.01); *G09G 2320/0257* (2013.01)

(58) Field of Classification Search
CPC ......... G09G 3/2074; G09G 2320/0247; G09G 3/3666; G09G 2300/0809; G09G 2310/06; G09G 2310/08

USPC ....................................... 345/87, 98, 99, 100
See application file for complete search history.

(56) References Cited

U.S. PATENT DOCUMENTS

| 8,102,493 B2* | 1/2012 | Li | G02F 1/1393 349/129 |
| 8,482,505 B2* | 7/2013 | Shimoshikiryoh | G09G 3/3655 345/690 |
| 8,803,855 B2* | 8/2014 | Goh | G09G 3/3648 345/204 |

FOREIGN PATENT DOCUMENTS

| CN | 103323990 A | 9/2013 |
| CN | 103744209 A | 4/2014 |

* cited by examiner

*Primary Examiner* — Duc Q Dinh
(74) *Attorney, Agent, or Firm* — Tim Tingkang Xia, Esq.; Locke Lord LLP

(57) ABSTRACT

A display device includes a first substrate, a second substrate, a display medium, a first pixel electrode, a second pixel electrode and a transparent electrode. Sub-pixel units are defined on the first substrate and the second substrate. A sub-pixel unit has a first sub-pixel and a second sub-pixel. The transparent electrode is disposed on the second substrate, and the transparent electrode receives a first common potential and a second common potential. When grey levels displayed by the first sub-pixel and the second sub-pixel are in the range of about 96 to 180, a potential difference between the first common potential received when the first sub-pixel has the maximum brightness and the second common potential received when the second sub-pixel has the minimum brightness is in the range of about 0 mV to 100 mV.

18 Claims, 5 Drawing Sheets

DISPLAY DEVICE

CROSS-REFERENCE TO RELATED PATENT APPLICATION

This application claims the benefit of priority to Taiwan Patent Application No. 105137635, filed Nov. 17, 2016. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

This disclosure relates to an image device, and in particular, to a display device.

BACKGROUND

With the rapid development of display technologies, display devices are widely applied to human life and play an increasingly important role. For example, the display devices can be applied to various electronic devices such as televisions, computers, and mobile phones. However, currently, an image burn-in phenomenon usually occurs after a display device available on the market is used for a long time. Specifically, when the image burn-in phenomenon of a display device is generated after a user uses the display device for a long time, the user can view an obvious ghost image (or namely, image sticking) on the display device. In this way, quality of user experience on the display device may be decreased.

Therefore, designing a display device by aiming at how to effectively alleviate the image burn-in phenomenon of the display device so as to improve the quality of user experience on the display device is a great challenge.

SUMMARY

An aspect of the present disclosure relates to a display device. The display device comprises a first substrate, a second substrate, a display medium, a first pixel electrode, a second pixel electrode, and a transparent electrode. The display medium is disposed between the first substrate and the second substrate. A plurality of sub-pixel units is defined on the first substrate and the second substrate, and at least one of the sub-pixel units has at least one first sub-pixel and at least one second sub-pixel. The first pixel electrode is disposed on the first substrate of the first sub-pixel. The second pixel electrode is disposed on the first substrate of the second sub-pixel, and the second pixel electrode is separated from the first pixel electrode. The transparent electrode is disposed on the second substrate, and the transparent electrode respectively corresponds to the first pixel electrode of the first sub-pixel and the second pixel electrode of the second sub-pixel. The transparent electrode receives a first common potential and a second common potential. When grey levels displayed by the first sub-pixel and the second sub-pixel are in the range of about 96 to 180, a potential difference between the first common potential received by the first sub-pixel has the maximum brightness and the second common potential received by the second sub-pixel has the minimum brightness is in the range of about 0 mV to 100 mV.

Another aspect of the present disclosure relates to a display device. The display device comprises a first substrate, a second substrate, a display medium, a first pixel electrode, a second pixel electrode, and a transparent electrode. The display medium is disposed between the first substrate and the second substrate. A plurality of sub-pixel units is defined on the first substrate and the second substrate, and at least one of the sub-pixel units has at least one first sub-pixel and at least one second sub-pixel. The first pixel electrode is disposed on the first substrate of the first sub-pixel. The second pixel electrode is disposed on the first substrate of the second sub-pixel, and the second pixel electrode is separated from the first pixel electrode. The transparent electrode is disposed on the second substrate, and the transparent electrode respectively corresponds to the first pixel electrode of the first sub-pixel and the second pixel electrode of the second sub-pixel. The transparent electrode receives a first common potential and a second common potential. When grey levels displayed by the first sub-pixel and the second sub-pixel are in the range of about 96 to 180, and the first sub-pixel and the second sub-pixel respectively have a first flicker value and a second flicker value, a potential difference between the first common potential corresponding to the first flicker value and the second common potential corresponding to the second flicker value is in the range of about −100 mV to 1 V.

The foregoing display device according to the exemplary embodiments of the present disclosure has the following effect: the display device disclosed in the present disclosure effectively reduces, by adjusting a potential difference between a first common potential that is received when the first sub-pixel meets a corresponding preset parameter requirement (for example, the maximum brightness or the first flicker value [for example, a minimum flicker value]) and a second common potential that is received when the second sub-pixel meets a corresponding preset parameter requirement (for example, the minimum brightness or a second flicker value [for example, a minimum flicker value]), a brightness difference between different regions in the display device, so as to alleviate an image burn-in phenomenon, thereby significantly improving the quality of user experience on the display device.

BRIEF DESCRIPTION OF THE DRAWINGS

The foregoing and other exemplary embodiments, advantages, and features of the present disclosure will become more comprehensible by means of the detailed description of the exemplary embodiments of the present disclosure below with reference to the accompanying drawings.

DETAILED DESCRIPTION

Figure 1A:
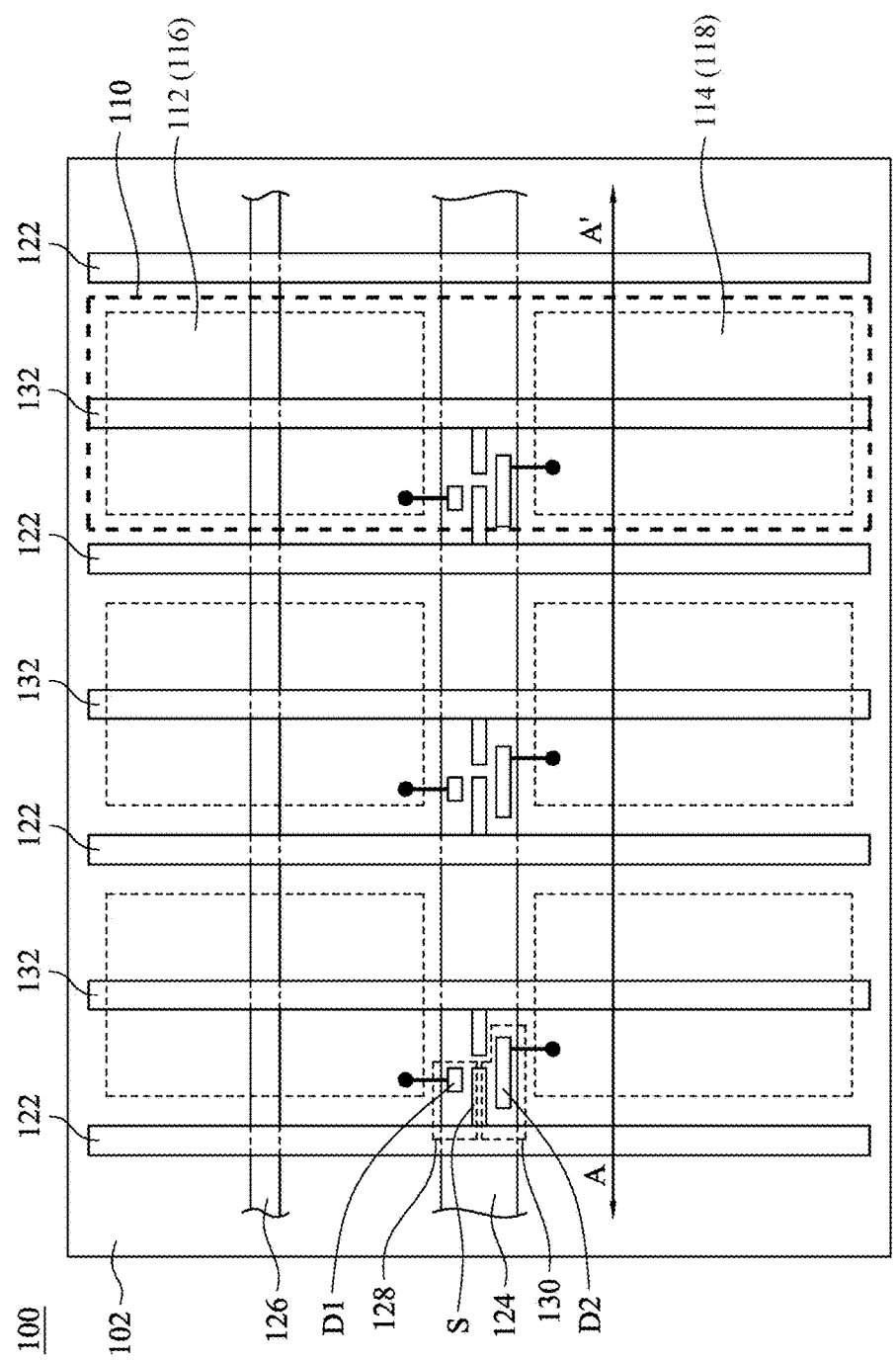
FIG. 1A is a schematic diagram of a display device according to the embodiments disclosed in the present disclosure.

The following describes the embodiments with reference to the accompanying drawings in detail, so as to make the aspects of the present disclosure more comprehensible. However, the mentioned embodiments are not intended to limit the scope of the present disclosure, and the description of the operation of a structure is not intended to limit an execution sequence. Any device with equivalent functions that is produced from a structure formed by a recombination of elements shall fall within the scope of the present disclosure. Besides, according to industry standards and practices, the drawings are merely intended to assist the description, and are not drawn according to original dimensions. In practice, dimensions of various features may be arbitrarily increased or decreased to facilitate the description. Same elements in the description below are indicated by a same reference sign, so as to facilitate the comprehension.

Besides, as used herein, the terms "including", "comprising", "having", "containing", and the like are to be understood to be open-ended, i.e., to mean including but not limited to. Besides, as used herein, "and/or" includes any one or a combination of one or more items in relevant enumerated items.

In the present disclosure, when an element is "connected" or "coupled", it may indicate that the element is "electrically connected" or "electrically coupled". "Connected" or "coupled" may further be used to indicate that two or more elements operate cooperatively or interact with each other. Oppositely, when an element is "directly on another element" or "directly connected to" another element, there is no intermediate element. As used herein, "connection" may refer to physical and/or electrical connection.

The terms used herein are merely used for describing specific embodiments, and are not limitative. As used herein, unless otherwise clearly indicated in the content, singular forms "a", "one", and "the" are intended to include plural forms, and include "at least one". "Or" indicates "and/or".

As used herein, "about", "similar", or "substantially" includes the value and an average value of values in an acceptable deviation range of a specific value determined by a person of ordinary skill in the art, taking the discussed measurement and a specific quantity of errors related to the measurement (that is, limitations of a measurement system) into consideration. For example, "about" may indicate within one or more standard deviations of the value, or within ±20%, ±10%, or ±5%.

Unless otherwise defined, as used herein, all the terms (including technical and scientific terms) have the same meanings as commonly understood by a person of ordinary skill in the art. It will be further understood that terms defined in commonly used dictionaries shall be comprehended as meanings the same as the meanings in the related art and the context of the present disclosure, and shall not be comprehended as ideal or excessively formal meanings, unless this specification clearly defined otherwise.

Figure 1B:
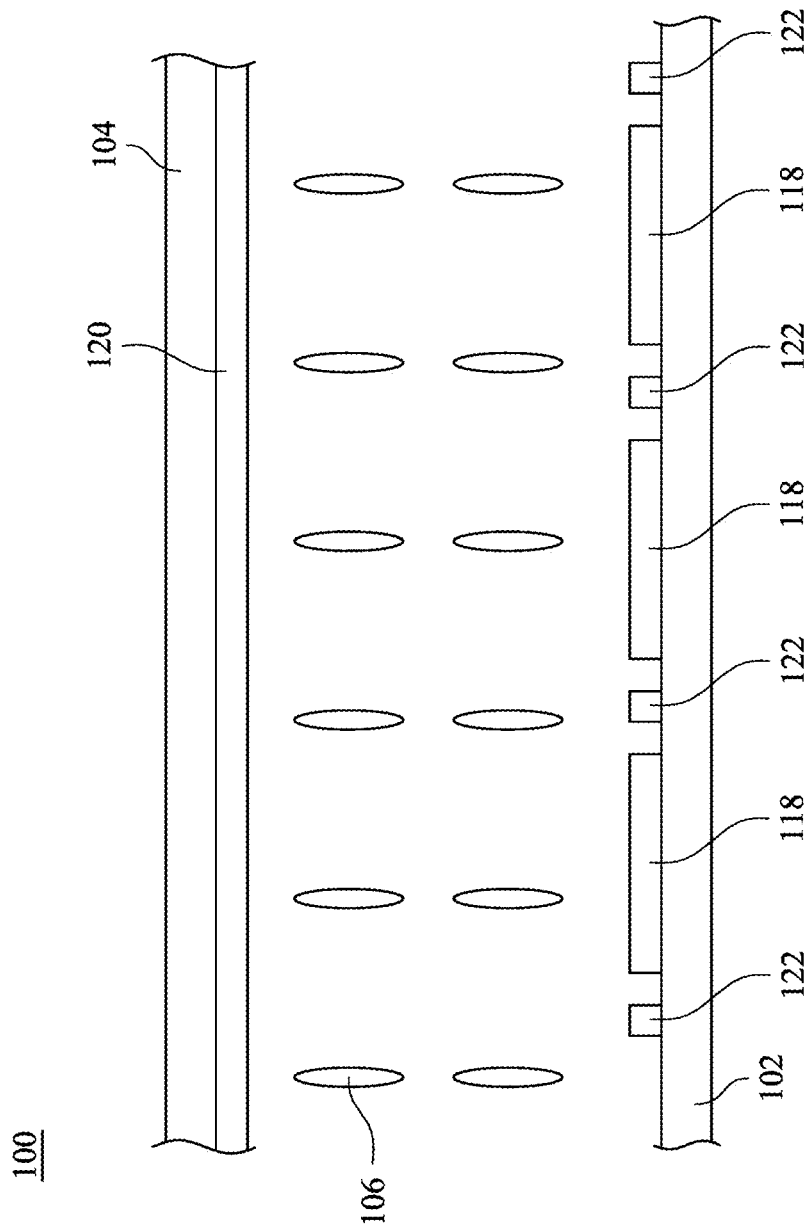
FIG. 1B is a simple schematic cross-section view of the display device according to the embodiments disclosed in the present disclosure.

Referring to FIG. 1A and FIG. 1B at the same time, FIG. 1A is a schematic diagram of a display device 100 according to the embodiment disclosed in the present disclosure, FIG. 1B is a simple schematic sectional view of the display device 100 according to the embodiments disclosed in the present disclosure, and FIG. 1B is a simple schematic cross-section view of the display device 100 taking along a cross-section line AA' in FIG. 1A. Referring to FIG. 1A and FIG. 1B at the same time, the display device 100 includes a first substrate 102, a second substrate 104, a display medium 106, a first pixel electrode 116, a second pixel electrode 118, and a transparent electrode 120, and the display medium 106 is disposed between the first substrate 102 and the second substrate 104. For example, the display medium 106 in this embodiment includes a non-self-luminous material, for example, liquid crystals, but present disclosure is not limited thereto. Therefore, if the display medium 106 is a non-self-luminous material, for example, a liquid crystal material, the display device 100 may be a vertical electric field type display device or a hybrid vertical and horizontal electric field type display device. If the display medium 106 is made of a self-luminous material, the display device 100 may be a self-luminous display device. In this embodiment, a plurality of sub-pixel units 110 is defined on the first substrate 102 and the second substrate 104, that is, the first substrate 102 and the second substrate 104 have a plurality of sub-pixel units 110 thereon, and preferably, each sub-pixel unit 110 has a first sub-pixel 112 and a second sub-pixel 114. In another embodiment, each of the first sub-pixel 112 and the second sub-pixel 114 is one sub-pixel unit, respectively. It should be noted that the first sub-pixel 112 at least includes a first pixel electrode 116, and the second sub-pixel 114 at least includes a second pixel electrode 118.

The first pixel electrode 116 is disposed on the first substrate 102 of the first sub-pixel 112 (or namely, the first pixel electrode 116 is disposed on the first sub-pixel 112 of the first substrate 102), the second pixel electrode 118 is disposed on the first substrate 102 of the second sub-pixel 114 (or namely, the second pixel electrode 118 is disposed on the second sub-pixel 114 of the first substrate 102), and the second pixel electrode 118 is separated from the first pixel electrode 116. The transparent electrode 120 is disposed on the second substrate 104, and the transparent electrode 120 respectively corresponds to the first pixel electrode 116 of the first sub-pixel 112 and the second pixel electrode 118 of the second sub-pixel 114. In this embodiment, the transparent electrode 120 may cover an entire surface of the second substrate 104, but the present disclosure is not limited thereto. In another embodiment, the transparent electrode 120 may be patterned to form a plurality of patterns, one pattern of the transparent electrode 120 corresponds to the first pixel electrode 116 of the first sub-pixel 112, and another pattern of the transparent electrode 120 corresponds to the second pixel electrode 118 of the second sub-pixel 114.

Besides, the transparent electrode 120 corresponding to the first sub-pixel 112 and corresponding to the second sub-pixel 114 respectively receive a first common potential and a second common potential. In other words, at different times, the transparent electrode 120 covering the entire surface of the second substrate 104 separately receives the first common potential and the second common potential, but the present disclosure is not limited thereto. In another embodiment, the patterned transparent electrode has the plurality of patterns, and therefore can selectively receive the first common potential and the second common potential at substantially the same time or at different times.

In an embodiment, referring to FIG. 1A, the display device may selectively include a common electrode 126, and the common electrode 126 is disposed on the first substrate 102. The common electrode 126 respectively corresponds to the first pixel electrode 116 of the first sub-pixel 112 and/or the second pixel electrode 118 of the second sub-pixel 114. A pixel electrode of a sub-pixel of the display device 100 is electrically connected to a data line through a corresponding switch device. For example, the first pixel electrode 116 is electrically connected to a data line 122 through a drain electrode D1 of a corresponding switch device 128, the second pixel electrode 118 is electrically connected to the data line 122 through a drain electrode D2 of a corresponding switch device 130, that is, the switch device 128 and the switch device 130 sharing a source electrode S, and the switch device 128 and the switch device 130 being connected to the same data line 122 is used as an example, but the present disclosure is not limited thereto.

In another embodiment, the switch device 128 (the source electrode) and the switch device 130 (the source electrode) may be respectively connected to different data lines, that is, the switch device 128 (the source electrode) and the switch device 130 (the source electrode) may not share a data line or may be the other suitable design, or the switch device 128 (the source electrode) and the switch device 130 (the source electrode) may respectively have independent source electrodes. Besides, a gate electrode (not marked) of the switch device 128 and a gate electrode (not marked) of the switch device 130 may be connected to a corresponding scan line. For example, the gate electrode (not marked) of the switch device 128 is connected to the corresponding scan line 124, the gate electrode (not marked) of the switch device 130 is connected to the corresponding scan line 124, that is, the gate electrode (not marked) of the switch device 128 and the gate electrode (not marked) of the switch device 130 being connected to a same scan line 124 is used as an example, but the present disclosure is not limited thereto. In another embodiment, the switch device 128 (the gate electrode) and the switch device 130 (the gate electrode) may be respectively connected to different scan lines, that is, the switch device 128 (the gate electrode) and the switch device 130 (the gate electrode) may not share a scan line or may be the other suitable design. Besides, at least one of the switch device 128 and the switch device 130 may include a bottom gate type transistor, a top gate type transistor, a three-dimensional channel type transistor, or another suitable transistor, or a combination thereof, and a material of the transistor may be amorphous silicon, microcrystalline silicon, monocrystalline silicon, polycrystalline silicon, an oxide semiconductor material, an organic semiconductor material, a carbon nanotube, or another suitable semiconductor material, or a combination thereof.

In another embodiment, the display device 100 of FIG. 1A may selectively include another common electrode 132, and the another common electrode 132 is disposed on the first substrate 102. The another common electrode 132 respectively corresponds to the first pixel electrode 116 of the first sub-pixel 112 and the second pixel electrode 118 of the second sub-pixel 114, that is, the another common electrode 132 may partially overlap the first pixel electrode 116 and the second pixel electrode 118 respectively, and both of the data line 122 and the scan line 124 are separated from the another common electrode 132. In some embodiments, the another common electrode 132 may be separated from or be connected to the common electrode 126 according to design requirements. Besides, the another common electrode 132 may be selectively connected to another switch device (not remarked), the another switch device (not shown) may include a portion of one of the switch device 128 and the switch device 130, or may not include the switch device 128 and the switch device 130. Therefore, at this time, the another switch device may have a voltage shunt function or another function, and reference may be made to the earlier description for a type and/or a semiconductor material of the another switch device, and the type and/or the semiconductor material of the another switch device may be substantially the same as or different from the earlier description. Further, if the plurality of first sub-pixels 112 in FIG. 1A also has a cross-section line like AA', the second pixel electrodes 118 in FIG. 1B are correspondingly modified into the first pixel electrodes 116, and reference may be made to the earlier description for the remaining description.

Figure 2A:
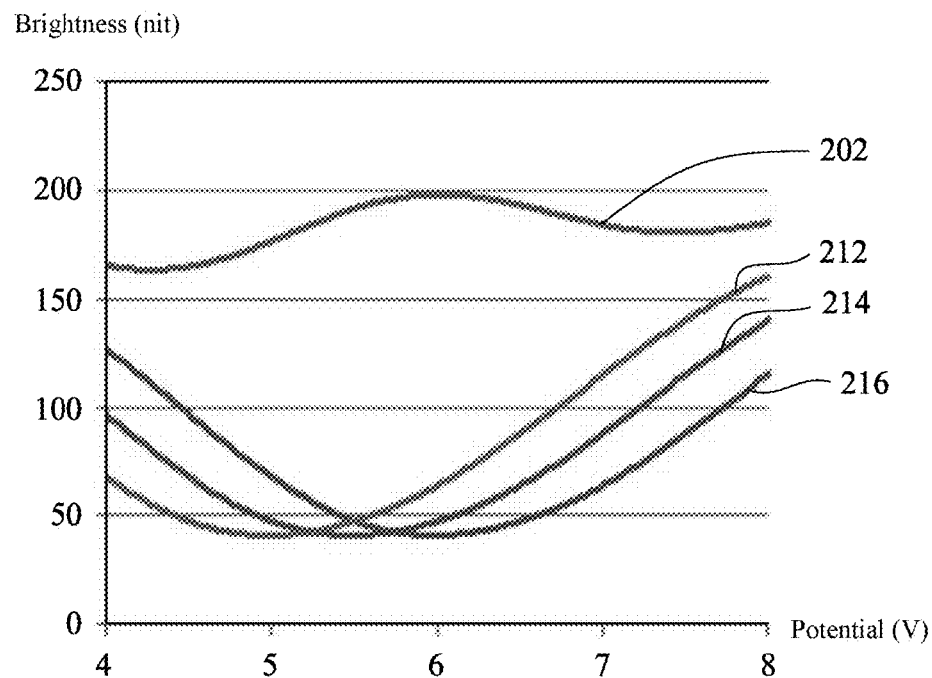
FIG. 2A is a curve diagram of the brightness of a first sub-pixel and a second sub-pixel after a transparent electrode corresponding to the first sub-pixel and the second sub-pixel respectively receive a first common potential and a second common potential according to the embodiments disclosed in the present disclosure.

In an embodiment, referring to FIG. 2A, FIG. 2A is a curve diagram of the brightness of a first sub-pixel 112 and a second sub-pixel 114 after a transparent electrode 120 corresponding to the first sub-pixel 112 and corresponding to the second sub-pixel 114 respectively receive a first common potential and a second common potential. As shown in FIG. 2A, after the transparent electrode 120 corresponding to the first sub-pixel 112 and corresponding to the second sub-pixel 114 respectively receive the first common potential and the second common potential, the first sub-pixel 112 and the second sub-pixel 114 will respectively be switched (for example, turn-on or turn-off) by the first common potential and the second common potential, that is, the first pixel electrode 116 of the first sub-pixel 112 and the second pixel electrode 118 of the second sub-pixel 114 respectively receive predetermined potentials (unit: voltage, V), and therefore a potential difference is generated between the first pixel electrode 116 and the transparent electrode 120 corresponding to the first sub-pixel 112 and a potential difference is generated between the second pixel electrode 118 and the transparent electrode 120 corresponding to the second sub-pixel 114, thereby driving the display medium 106 to be transparent (or display) or opaque (or not display). The potential of the first pixel electrode 116 being greater than the potential of the second pixel electrode 118 is used as an example. Therefore, the first sub-pixel 112 will have the brightness (as shown in a curve 202 in FIG. 2A, unit: nit) corresponding to the first common potential (unit: V), and the second sub-pixel 114 will have the brightness (as shown in a curve 212, a curve 214, or a curve 216 in FIG. 2A, unit: nit) corresponding to the second common potential (unit: V).

Besides, the curve 202 is the corresponding brightness of the first sub-pixel 112 after the transparent electrode 120 corresponding to the first sub-pixel 112 receives the first common potential (for example, a first potential); the curve 216 is the brightness the second sub-pixel 114 after the transparent electrode 120 corresponding to the second sub-pixel 114 receives the first potential; the curve 214 is the corresponding brightness of the second sub-pixel 114 after the transparent electrode 120 corresponding to the second sub-pixel 114 receives a second potential, and the second potential is a sum of the first potential and a first shift potential (for example, about 0.5 V); and the curve 212 is the brightness of the second sub-pixel 114 after the transparent electrode 120 corresponding to the second sub-pixel 114 receives a third potential, and the third potential is a sum of the first potential and a second shift potential (for example, about 1 V). In other words, the brightness per unit area (unit: nit/im$^2$) of the first sub-pixel 112 is greater than the brightness per unit area (unit: nit/im$^2$) of the second sub-pixel 114.

Figure 2B:
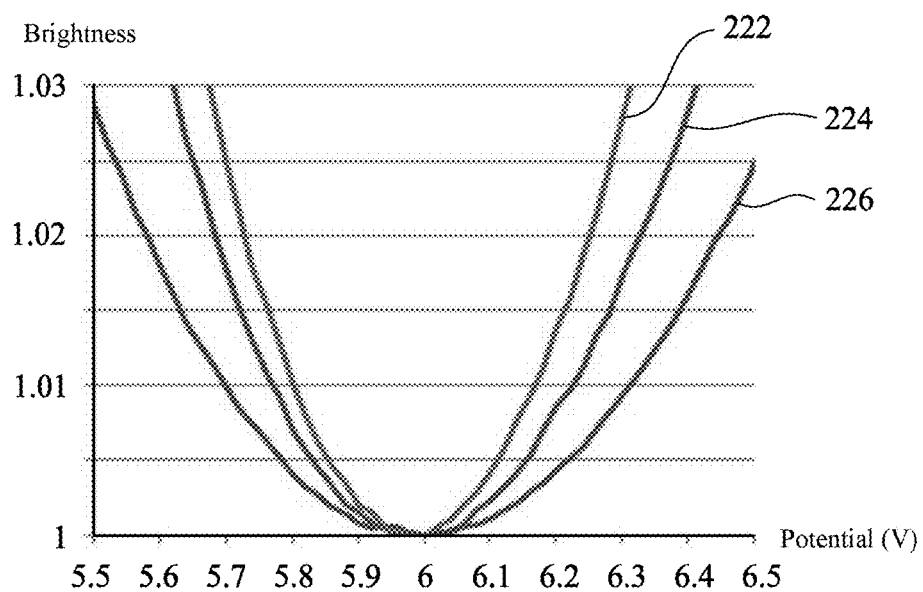
FIG. 2B is a curve diagram of the brightness of a sub-pixel unit after a transparent electrode corresponding to the sub-pixel unit receives the first common potential and the second common potential according to the embodiments disclosed in the present disclosure.

In another embodiment, referring to FIG. 2A and FIG. 2B at the same time, FIG. 2B is a curve diagram of the brightness of a sub-pixel unit 110 after a transparent electrode 120 corresponding to the first sub-pixel unit 110 receives the first common potential and the second common potential according to the embodiments disclosed in present disclosure. The brightness of the sub-pixel unit 110 is obtained by adding the brightness of the first sub-pixel 112 after the first common potential is received (as shown in FIG. 2A) and the brightness of the second sub-pixel 114 after the second common potential is received (as shown in FIG. 2A), and then carrying out normalization processing (unit: none, the brightness is the normalized brightness, and therefore there is no brightness unit, as shown in FIG. 2B). For example, the brightness obtained by adding the brightness of the sub-pixel unit 110 after the first common potential is received and the brightness of the sub-pixel unit 110 after the second common potential is received, and then carrying out the normalization processing (as shown in a curve 222, a curve 224, or a curve 226 in FIG. 2B) is equal to the brightness obtained by adding the brightness of the first sub-pixel 112 after the first common potential is received (as shown in the curve 202) and the brightness of the second sub-pixel 114 after the second common potential is received (as shown in the curve 212, the curve 214, or the curve 216), and then carrying out normalization processing on the brightness obtained after the addition.

In other words, the curve 222 is equivalent to a curve obtained after carrying out the normalization processing on a sum of the curve 202 and the curve 212, the curve 224 is equivalent to a curve obtained after carrying out the normalization processing on a sum of the curve 202 and the curve 214, and the curve 226 is equivalent to a curve obtained after carrying out the normalization processing on a sum of the curve 202 and the curve 216. In addition, the numerator in the normalization processing manner is sums of brightness values of curves at approximate same potentials, and the denominator is a minimum brightness value in the plurality of sums. For example, the curve 202 has a plurality of values and the curve 212 also has a plurality of values, and therefore, a sum of a value in the curve 202 and a value in the curve 212 at an approximate same potential may be obtained, so as to obtain a plurality of non-normalized values, each of which is used as the numerator; a minimum value in the plurality of non-normalized values is selected as the denominator; the numerator and the denominator are applied to the normalization manner, so as to obtain a plurality of normalized values (brightness); the plurality of normalized values and a plurality of potentials are used to form a diagram, so as to obtain the curve 222. The remaining curves 224, 226 are obtained by means of the foregoing manner, and details are not described herein again.

In yet another embodiment, when the potential difference between the first common potential (such as about 6V represented by the curve 202 in the FIG. 2A) that is received when the first sub-pixel 112 has the maximum brightness (such as about 200 nit represented by the curve 202 in the FIG. 2A) and the second common potential (such as about 5V represented by the curve 212, about 5.5V represented by the curve 214, or about 6V represented by the curve 216) that is received when the second sub-pixel 114 has the minimum brightness (such as about 40 nit respectively represented by the curve 212, 214, or 216 in the FIG. 2A) is raised, the sum of the brightness of the sub-pixel unit 110 after the first common potential and the second common potential is respectively received, and the curve relationship between the brightness and the voltage is steeper (such as the curve 222 in the FIG. 2B); when the potential difference between the first common potential that is received when the first sub-pixel 112 has the maximum brightness and the second common potential that is received when the second sub-pixel 114 has the minimum brightness is reduced, the sum of the brightness of the sub-pixel unit 110 after the first common potential and the second common potential is respectively received, and the curve relationship between the brightness and the voltage is gentler (such as the curve 224 or 226 in the FIG. 2B). For example, the potential differences between the first common potential corresponding to the maximum brightness represented by the curve 202 in FIG. 2A and the second common potential corresponding to the minimum brightness represented by the curve 212, the curve 214, and the curve 216 in FIG. 2A are respectively about 1 V, 0.5 V, and 0 V, and therefore, the curve 222 (the normalized brightness) in FIG. 2B has the steeper curve (or namely, the sharper curve, for example, the potential difference is about 1V), and the curve 226 (the normalized brightness) in FIG. 2B has the gentler curve (or namely, the gradual curve, for example, the potential difference is about 1 V). Therefore, when the sub-pixel unit 110 of the display device 100 has the gentler curve and an image burn-in phenomenon test is carried out, a brightness difference between a black burn region and a white burn region on the sub-pixel unit 110 can meet a difference standard, thereby effectively alleviating an image burn-in phenomenon of the display device 100 and improving the user experience on the display device 100. In an embodiment, when grey levels (unit: none) displayed by the first sub-pixel 112 and the second sub-pixel 114 are in the range of about 96 to 180, the potential difference between the first common potential that is received when the first sub-pixel 112 has the maximum brightness and the second common potential that is received when the second sub-pixel 114 has the minimum brightness is in the range of about 0 mV to 100 mV. For example, when the potential difference between the first common potential that is received when the first sub-pixel 112 has the maximum brightness and the second common potential that is received when the second sub-pixel 114 has the minimum brightness is in the range of about 0 mV to 100 mV, the curve corresponding to the brightness of the sub-pixel unit 110 after the first common potential and the second common potential are received is gentle enough, and in this way, when the display device 100 undergoes the image burn-in phenomenon test, the brightness difference between the black burn region and the white burn region on the sub-pixel unit 110 can meet the difference standard, thereby effectively alleviating the image burn-in phenomenon of the display device 100 and improving the user experience on the display device 100.

In another embodiment, preferably, when the grey levels displayed by the first sub-pixel 112 and the second sub-pixel 114 are one of 96, 128, or 180, the potential difference between the first common potential that is received when the first sub-pixel 112 has the maximum brightness and the second common potential that is received when the second sub-pixel 114 has the minimum brightness is in the range of about 0 mV to 100 mV, thereby alleviating the image burn-in phenomenon of the display device 100 and improving the user experience on the display device 100 in a more effective manner. In yet another embodiment, the potential difference between the first common potential that is received when the first sub-pixel 112 has the maximum brightness and the second common potential that is received when the second sub-pixel 114 has the minimum brightness may be correspondingly adjusted by adjusting a ratio of a capacitance between the gate electrode and the source electrode S of the switch device 128 of the first sub-pixel 112 to an entire capacitance (such as entire capacitance of the first sub-pixel 112) and adjusting a ratio of a capacitance between the gate electrode and the source electrode S of the switch device 130 of the second sub-pixel 114 to an entire capacitance (such as entire capacitance of the second sub-pixel 114), thereby allowing the potential difference between the first common potential that is received when the first sub-pixel 112 has the maximum brightness and the second common potential that is received when the second sub-pixel 114 has the minimum brightness to fall within the foregoing feasible implementation scope, but the present disclosure is not limited thereto. In another embodiment, the potential difference may be accordingly adjusted by adjusting a ratio of a channel width to a channel length of the switch device 128 of the first sub-pixel 112 and a ratio of a channel width to a channel length of the switch device 130 of the second sub-pixel 114, thereby allowing the potential difference between the first common potential that is received when the first sub-pixel 112 has the maximum brightness and the second common potential that is received when the second sub-pixel 114 has the minimum brightness to fall within the foregoing feasible implementation scope, but the present disclosure is not limited thereto.

In still another embodiment, the brightness of the first sub-pixel 112 after the first common potential is received, and the first common potential show a convex function relationship; and the brightness of the second sub-pixel 114 after the second common potential is received, and the second common potential show a concave function relationship. For example, when the brightness of the first sub-pixel 112 after the first common potential is received, and the first common potential show a convex function relationship, it can be ensured that the first sub-pixel 112 has the maximum brightness after the first common potential is received, and the first common potential that is received when the first sub-pixel 112 has the maximum brightness may be a unique value; and when the brightness of the second sub-pixel 114 after the second common potential is received, and the second common potential show a concave function relationship, it can be ensured that the second sub-pixel 114 has the minimum brightness after the second common potential is received, and the second common potential that is received when the second sub-pixel 114 has the minimum brightness may be a unique value. It should be understood that the foregoing embodiments are merely used to illustrate feasible implementation manners that can alleviate the image burn-in phenomenon of the display device 100, but the present disclosure is not limited thereto, and refer to the description below for another feasible implementation manner.

In an embodiment, when the grey levels displayed by the first sub-pixel 112 and the second sub-pixel 114 are in the range of about 96 to 180, and the first sub-pixel 112 and the second sub-pixel 114 respectively have a first flicker value and a second flicker value, a potential difference between the first common potential corresponding to the first flicker value and the second common potential corresponding to the second flicker value is in the range of about −100 mV to 1 V. For example, referring to FIG. 3A, when the potential difference between the first common potential corresponding to the first flicker value and the second common potential corresponding to the second flicker value is in the range of about −100 mV to 1 V, the curve corresponding to the brightness of the sub-pixel unit 110 after the first common potential and the second common potential are received is gentle enough, and in this way, when the display device 100 undergoes the image burn-in phenomenon test, the brightness difference between the black burn region and the white burn region on the sub-pixel unit 110 can meet the difference standard, thereby effectively alleviating the image burn-in phenomenon of the display device 100 and improving the user experience on the display device 100.

Figure 3A:
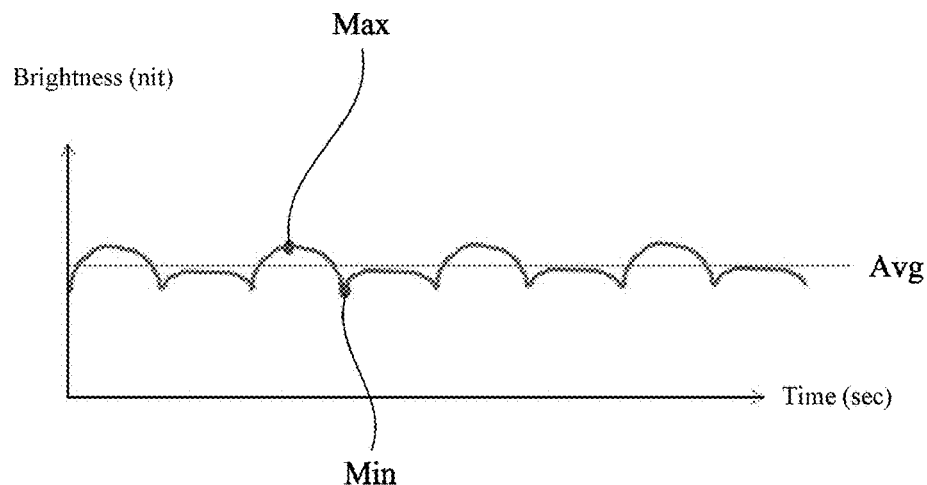
FIG. 3A is a schematic diagram of the fluctuating brightness of the first sub-pixel when the first sub-pixel continuously receives the first common potential during a preset time according to the embodiments disclosed in the present disclosure.

In another embodiment, referring to FIG. 3A, FIG. 3A is a schematic diagram of the fluctuating brightness of the first sub-pixel 112 when the first sub-pixel 112 continuously receives the first common potential during a predetermined time according to the embodiments disclosed in the present disclosure. For the first sub-pixel 112, the second sub-pixel 114, and related elements such as the pixel electrode, the transparent electrode, the common electrode, and the switch of the display device 100, reference may be made to the earlier description, and details are not described herein again. As shown in FIG. 3A, when the transparent electrode 120 corresponding to the first sub-pixel 112 continuously receives the first common potential during a predetermined time (unit: second, sec), the first sub-pixel 112 has the fluctuating brightness (or namely the floating brightness, unit: nit) corresponding to the first common potential, and the fluctuating brightness shows a continuous function during the predetermined time. Besides, when the first pixel electrode 116 of the first sub-pixel 112 receives a predetermined potential, a potential difference exists between the first pixel electrode 116 and the transparent electrode 120, thereby driving the display medium to be transparent (or display) or opaque (or not display). Therefore, a corresponding definition of the first flicker value may be a value obtained by subtracting a minimum value Min of the fluctuating brightness from a maximum value Max of the fluctuating brightness and then dividing an obtained value by an average value Avg of the fluctuating brightness. Besides, a corresponding definition of the first flicker value may represented as a color display analyzer, for example, data measured by a color display analyzer CA210/CA310 when the color display analyzer CA210/CA310 switches to a "flicker" measurement mode, but the present disclosure is not limited thereto, the corresponding definition of the first flicker may be represented as another color analyzer. However, values being compared need to be obtained by analyzers of a same model. A corresponding definition of the second flicker value is similar to that of the first flicker value and is illustrated in the foregoing embodiment in detail, and therefore, details are not described herein again.

Figure 3B:
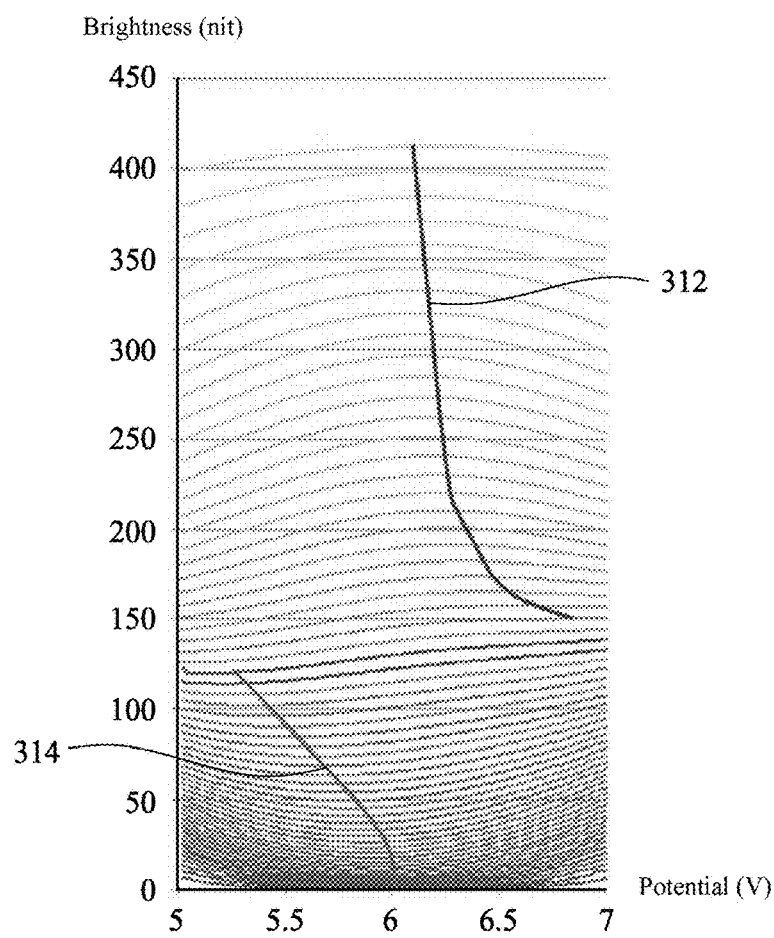
FIG. 3B is a curve diagram of the brightness of the first sub-pixel and the second sub-pixel after the first sub-pixel and the second sub-pixel respectively receive the first common potential and the second common potential according to the embodiments of the present disclosure.

In yet another embodiment, when the first flicker value is generated according to the brightness of the first sub-pixel 112 after the transparent electrode 120 corresponding to the first sub-pixel 112 receives the first common potential, and the second flicker value is generated according to the brightness of the second sub-pixel 114 after the transparent electrode 120 corresponding to the second sub-pixel 114 receives the second common potential, the second common potential corresponding to the second flicker value is greater than the first common potential corresponding to the first flicker value. For example, referring to FIG. 3B, FIG. 3B is a curve diagram of the brightness of a first sub-pixel 112 and a second sub-pixel 114 after a transparent electrode 120 corresponding to the first sub-pixel 112 and corresponding to the second sub-pixel 114 receives a first common potential and a second common potential, respectively. As shown in FIG. 3B, when the first sub-pixel 112 has the first flicker value due to the first common potential received by the transparent electrode 120 corresponding to the first sub-pixel 112, and the second sub-pixel 114 has the second flicker value due to the second common potential received by the transparent electrode 120 corresponding to the second sub-pixel 114, the potential difference between the first common potential that is received when the first sub-pixel 112 has the maximum brightness (as shown in a curve 312 in FIG. 3B) and the second common potential that is received when the second sub-pixel 114 has the minimum brightness (as shown in a curve 314 in FIG. 3B) is excessively large, causing that the curve corresponding to the brightness of the sub-pixel unit 110 after the first common potential and the second common potential are received is excessively steep (or namely excessively sharp). Therefore, the second common potential corresponding to the second flicker value is adjusted to enable the second common potential corresponding to the second flicker value to be greater than the first common potential corresponding to the first flicker value, so as to enable the curve corresponding to the brightness of the sub-pixel unit 110 after the first common potential and the second common potential are received to be enough gentle, and in this way, when the display device 100 undergoes the image burn-in phenomenon test, the brightness difference between the black burn region and the white burn region on the sub-pixel unit 110 can meet the difference standard, thereby effectively alleviating the image burn-in phenomenon of the display device 100 and improving the user experience on the display device 100.

Figure 3C:
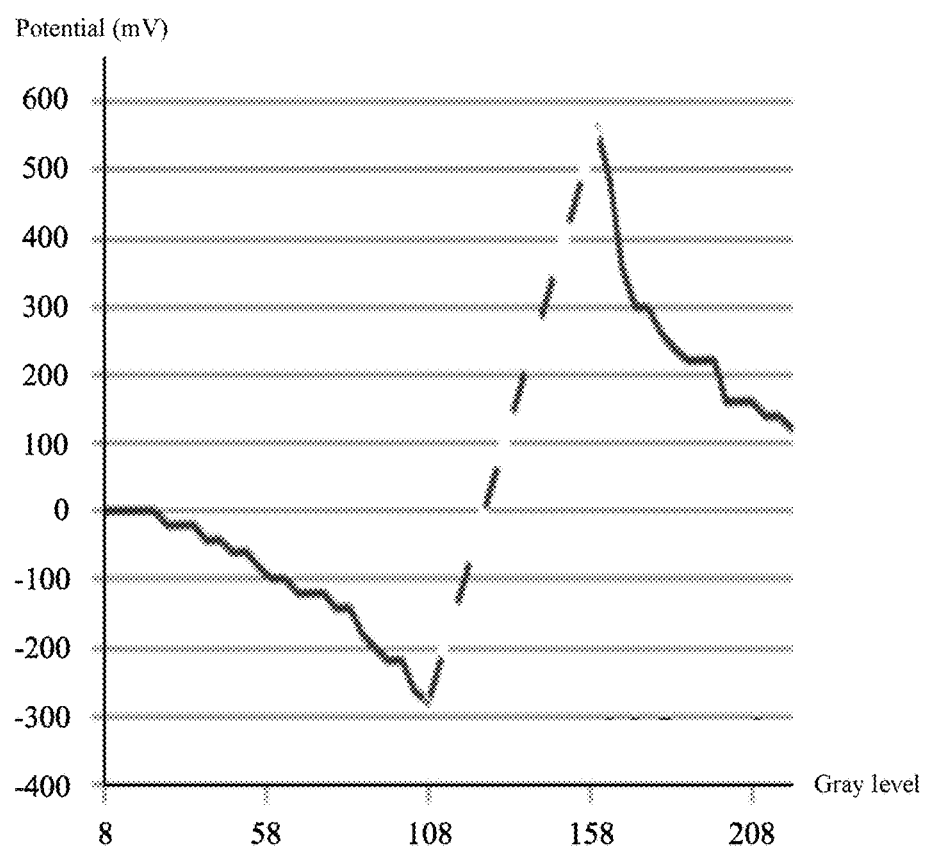
FIG. 3C is a schematic diagram of a compensation amount of a potential difference between a first common potential corresponding to a first flicker value and a second common potential corresponding to a second flicker value according to the embodiments disclosed in the present disclosure.

Further referring to FIG. 3C, FIG. 3C is a schematic diagram of a compensation amount of a potential difference between a first common potential corresponding to a first flicker value and a second common potential corresponding to a second flicker value according to the embodiments disclosed in the present disclosure. For example, when the gray values displayed by the first sub-pixel 112 and the second sub-pixel 114 are 128, the second common potential corresponding to the second flicker value may be adjusted to rise (or namely increased) by about 400 mV (or namely an adjustment potential, milli-voltage, mV), that is, the predetermined second common potential adds the adjustment potential, and in this way, the first common potential that is received when the first sub-pixel 112 has the maximum brightness may be substantially the same as the second common potential that is received when the second sub-pixel 114 has the minimum brightness, thereby maintaining an enough gentle curve corresponding to the brightness of the sub-pixel unit 110 after the first common potential and the second common potential are received. Likewise, the second common potential corresponding to other gray values is adjusted to rise or fall (or namely potential adjustment) by referring to the curve shown in FIG. 3C, so as to maintain an enough gentle curve corresponding to the brightness of the sub-pixel unit 110 after the first common potential and the second common potential are received, thereby effectively alleviating the image burn-in phenomenon of the display device 100 and improving the user experience on the display device 100.

In an embodiment, preferably, when the gray values displayed by the first sub-pixel 112 and the second sub-pixel 114 are one of 96, 128, or 180, the potential difference between the first common potential corresponding to the first flicker value and the second common potential corresponding to the second flicker value is preferable in the range of about 100 mV to 1V, and therefore, the curve corresponding to the brightness is gentle enough, and in this way, when the display device 100 undergoes the image burn-in phenomenon test, the brightness difference between the black burn region and the white burn region on the sub-pixel unit 110 better meets the difference standard, thereby alleviating the image burn-in phenomenon of the display device 100 and improving the user experience on the display device 100 in a more effective manner. In still another embodiment, the first flicker value and the second flicker value are respectively the minimum flicker value of the first sub-pixel 112 and the minimum flicker value of the second sub-pixel 114. In some embodiments, preferably, when the potential difference obtained by subtracting the first common potential corresponding to the first flicker value from the second common potential corresponding to the second flicker value is in the range of about 100 mV to 1V, the image burn-in phenomenon of the display device 100 can be improved in a more effective manner, thereby improving the user experience on the display device 100. Feasible definitions related to the first flicker value and the second flicker value are illustrated in the foregoing embodiments, and therefore, details are not described herein again. For example, after a plurality of first flicker values and a plurality of second flicker values are generated repeatedly according to the feasible definitions of the first flicker value and the second flicker value illustrated in the foregoing embodiments, a first flicker value with a minimum value is taken out from the plurality of first flicker values and is used as the minimum flicker value of the first sub-pixel 112, and a second flicker value with a minimum value is taken out from the plurality of second flicker values and is used as the minimum flicker value of the second sub-pixel 114. It should be understood that the first flicker value and the second flicker value may be correspondingly set according to actual requirements. For example, when the first flicker value is substantially equal to the second flicker value, the minimum flicker value of the first sub-pixel 112 is substantially equal to the minimum flicker value of the second sub-pixel 114; or when the first flicker value is different from the second flicker value, the minimum flicker value of the first sub-pixel 112 is different from the minimum flicker value of the second sub-pixel 114. Further, different sub-pixel sizes, sub-pixel design, and/or other factors may affect a flicker value (for example, the minimum flicker value), and therefore, the flicker value (for example, the minimum flicker value) may change. However, the design and manners of the foregoing embodiments can still be applied to the changed value, thereby effectively alleviating the image burn-in phenomenon of the display device 100 and improving the user experience on the display device 100, and details are not described herein again. In some embodiments, the display panel of the foregoing embodiments may selectively use different gammas, for example, gamma 2.2 to improve the frame quality of the display panel presented by gray levels, but the present disclosure is not limited thereto. In a portion of embodiments, the display panel may not use gamma to further improve the frame quality of the display panel displayed by the gray levels.

Although the present disclosure is described with reference to exemplary embodiments that are currently considered as practical, it should be understood that the present disclosure is not limited to the disclosed embodiments, and on the contrary, various modifications and equivalent configurations fall within the spirit and scope of the appended claims.

What is claimed is:

1. A display device, comprising:
a first substrate;
a second substrate;
a display medium, disposed between the first substrate and the second substrate, a plurality of sub-pixel units being defined on the first substrate and the second substrate, and at least one of the sub-pixel units having at least one first sub-pixel and at least one second sub-pixel;
a first pixel electrode, disposed on the first substrate and corresponding to the first sub-pixel;
a second pixel electrode, disposed on the first substrate and corresponding to the second sub-pixel, and the second pixel electrode being separated from the first pixel electrode; and
a transparent electrode, disposed on the second substrate, the transparent electrode corresponding respectively to the first pixel electrode of the first sub-pixel and the second pixel electrode of the second sub-pixel, and the transparent electrode receiving a first common potential and a second common potential, wherein
when grey levels displayed by the first sub-pixel and the second sub-pixel are in a range of about 96 to 180, a potential difference between a first common potential received by the first sub-pixel having a maximum brightness and a second common potential received by the second sub-pixel having a minimum brightness is in a range of about 0 mV to 100 mV.

2. The display device according to claim 1, wherein the first sub-pixel exhibits a first value of brightness when receiving the first common potential, and the first value of brightness of the first sub-pixel and the first common potential have a convex function relationship; the second sub-pixel exhibits a second value of brightness when receiving the second common potential, and the second value of brightness of the second sub-pixel and the second common potential have a concave function relationship.

3. The display device according to claim 1, wherein when the grey levels displayed by the first sub-pixel and the second sub-pixel are 96, 128, or 180, the potential difference between the first common potential received by the first sub-pixel having the maximum brightness and the second common potential received by the second sub-pixel having the minimum brightness is in the range of about 0 mV to 100 mV.

4. The display device according to claim 1, wherein the display device further comprises a common electrode, the common electrode is disposed on the first substrate, and the common electrode corresponds respectively to the first pixel electrode of the first sub-pixel and the second pixel electrode of the second sub-pixel.

5. A display device, comprising:
a first substrate;
a second substrate;
a display medium, disposed between the first substrate and the second substrate, a plurality of sub-pixel units being defined on the first substrate and the second substrate, and at least one of the sub-pixel units having at least one first sub-pixel and at least one second sub-pixel;
a first pixel electrode, disposed on the first substrate and corresponding to the first sub-pixel;
a second pixel electrode, disposed on the first substrate and corresponding to the second sub-pixel, and the second pixel electrode being separated from the first pixel electrode; and
a transparent electrode, disposed on the second substrate, the transparent electrode corresponding respectively to the first pixel electrode of the first sub-pixel and the second pixel electrode of the second sub-pixel, and the transparent electrode receiving a first common potential and a second common potential, wherein
when grey levels displayed by the first sub-pixel and the second sub-pixel are in a range of about 96 to 180, and the first sub-pixel and the second sub-pixel respectively have a first flicker value and a second flicker value, a potential difference between the first common potential corresponding to the first flicker value and the second common potential corresponding to the second flicker value is in a range of about −100 mV to 1 V.

6. The display device according to claim 5, wherein the first sub-pixel exhibits a first value of brightness when receiving the first common potential, and the first value of brightness of the first sub-pixel and the first common potential have a concave function relationship; the second sub-pixel exhibits a second value of brightness when receiving the second common potential, and the second value of brightness of the second sub-pixel and the second common potential have a convex function relationship.

7. The display device according to claim 5, wherein the first flicker value is generated according to a first value of brightness exhibited by the first sub-pixel receiving the first common potential, the second flicker value is generated according to a second value of brightness exhibited by the second sub-pixel receiving the second common potential, and the second common potential corresponding to the second flicker value is greater than the first common potential corresponding to the first flicker value.

8. The display device according to claim 6, wherein the first flicker value is generated according to the first value of brightness exhibited by the first sub-pixel receiving the first common potential, the second flicker value is generated according to the second value of brightness exhibited by the second sub-pixel receiving the second common potential, and the second common potential corresponding to the second flicker value is greater than the first common potential corresponding to the first flicker value.

9. The display device according to claim 5, wherein the potential difference between the first common potential corresponding to the first flicker value and the second common potential corresponding to the second flicker value is in a range of about 100 mV to 1 V.

10. The display device according to claim 5, wherein when the grey levels displayed by the first sub-pixel and the second sub-pixel are 96, 128, or 180, the potential difference between the first common potential corresponding to the first flicker value and the second common potential corresponding to the second flicker value is in a range of about 100 mV to 1 V.

11. The display device according to claim 6, wherein when the grey levels displayed by the first sub-pixel and the second sub-pixel are 96, 128, or 180, the potential difference between the first common potential corresponding to the first flicker value and the second common potential corresponding to the second flicker value is in a range of about 100 mV to 1 V.

12. The display device according to claim 5, wherein the first flicker value is substantially equal to the second flicker value.

13. The display device according to claim 5, wherein the first flicker value is different from the second flicker value.

14. The display device according to claim 5, wherein the first flicker value and the second flicker value are respectively a minimum flicker value of the first sub-pixel and a minimum flicker value of the second sub-pixel.

15. The display device according to claim 5, wherein the display device further comprises a common electrode, the common electrode is disposed on the first substrate, and the common electrode corresponds respectively to the first pixel electrode of the first sub-pixel and the second pixel electrode of the second sub-pixel.

16. The display device according to claim 5, wherein a value of brightness per unit area of the first sub-pixel is greater than a value of brightness per unit area of the second sub-pixel.

17. The display device according to claim 5, wherein the potential difference is obtained by subtracting the first common potential corresponding to the first flicker value from the second common potential corresponding to the second flicker value and is in a range of about 100 mV to 1 V, and the first flicker value and the second flicker value are respectively a minimum flicker value of the first sub-pixel and a minimum flicker value of the second sub-pixel.

18. The display device according to claim 17, wherein the gray levels displayed by the first sub-pixel and the second sub-pixel are in the range of about 96 to 180.

* * * * *